United States Patent
Park et al.

(10) Patent No.: US 8,267,339 B2
(45) Date of Patent: Sep. 18, 2012

(54) TRANSFER UNIT HAVING TRANSFER ROTOR AND FOOD WASTE TREATMENT APPARATUS USING THE SAME

(75) Inventors: Myung Jin Park, Seoul (KR); Chang Young Lee, Cheonan-si (KR); Dong Hee Jang, Seoul (KR)

(73) Assignee: Woongjin Coway Co., Ltd., Gongju-si (KR)

( * ) Notice: Subject to any disclaimer, the term of this patent is extended or adjusted under 35 U.S.C. 154(b) by 308 days.

(21) Appl. No.: 12/703,617

(22) Filed: Feb. 10, 2010

(65) Prior Publication Data

US 2010/0213298 A1      Aug. 26, 2010

(30) Foreign Application Priority Data

Feb. 20, 2009      (KR) .................. 10-2009-0014285

(51) Int. Cl.
 - *B02C 13/00* (2006.01)
 - *B07B 13/00* (2006.01)

(52) U.S. Cl. ................... 241/73; 241/74; 241/152.2
(58) Field of Classification Search ............ 241/65, 241/73, 74, 260.1, 152.2, 101.78
See application file for complete search history.

(56) References Cited

U.S. PATENT DOCUMENTS

| | | | |
|---|---|---|---|
| 2,970,776 A | | 2/1961 | Buckman |
| 3,926,379 A | * | 12/1975 | Dryden et al. .............. 241/69 |
| 4,461,428 A | * | 7/1984 | Williams .................... 241/34 |
| 4,749,133 A | * | 6/1988 | Sayler et al. ............... 241/56 |
| 5,035,367 A | * | 7/1991 | Nojima ..................... 241/37.5 |
| 5,141,166 A | | 8/1992 | Maynard, Jr. .......... 241/46.015 |
| 5,150,844 A | * | 9/1992 | McKie ....................... 241/73 |
| 5,386,947 A | * | 2/1995 | Omann ....................... 241/41 |
| 5,402,948 A | * | 4/1995 | Kaczmarek ................. 241/73 |
| 6,749,138 B2 | * | 6/2004 | Hart et al. .................. 241/73 |
| 2003/0168537 A1 | * | 9/2003 | Hart et al. .................. 241/18 |

FOREIGN PATENT DOCUMENTS

| | | |
|---|---|---|
| AU | 512380 | 10/1980 |
| JP | 03-157181 | 7/1991 |
| JP | 05-246502 | 9/1993 |
| KR | 1020090041801 | 4/2009 |
| WO | 2005/061134 | 7/2005 |

OTHER PUBLICATIONS

European Search Report, for EP10001680, mailed Jun. 23, 2010, 8 pages.

* cited by examiner

*Primary Examiner* — Bena Miller
(74) *Attorney, Agent, or Firm* — Seed IP Law Group PLLC

(57) ABSTRACT

The present invention provides a transfer unit having a transfer rotor and a food waste treatment apparatus using the transfer unit. The transfer unit includes the transfer rotor, a housing and a sieve. The transfer rotor includes a rotor body, and at least one blade provided on the circumferential outer surface of the rotor body. The housing has a hollow container shape and contains the transfer rotor therein such that the transfer rotor is rotatable without interference from the housing. The housing is inclined at a predetermined angle with respect to the horizontal plane. The sieve is provided in the housing to guide discharge of sewage from food waste. The sieve is disposed in the lower portion of the housing to drain the sewage generated from the food waste to the outside of the housing.

10 Claims, 6 Drawing Sheets

TRANSFER UNIT HAVING TRANSFER ROTOR AND FOOD WASTE TREATMENT APPARATUS USING THE SAME

CROSS-REFERENCE TO RELATED APPLICATION

This application claims the benefit under 35 U.S.C. §119(e) of Korean Application No. 10-2009-0014285, filed Feb. 20, 2009, which application is incorporated herein by reference in its entirety.

BACKGROUND OF THE INVENTION

1. Field of the Invention

The present invention relates generally to transfer units having transfer rotors and, more particularly, to a transfer unit having a transfer rotor which is constructed such that sewage is easily removed from food waste during treatment of the food waste and sludge is prevented from forming in the transfer unit in which the food waste is transferred, thus preventing offensive odors from being generated. Furthermore, the present invention relates to a food waste treatment apparatus using the transfer unit.

2. Description of the Related Art

Generally, methods of treating food waste are classified into a method of fermenting food waste using microbes and composting or decomposing the food waste, and a method of physically compressing or pulverizing food waste and drying it.

The method of treating food waste using microbes has disadvantages owing to the limitations in the properties of food waste. Furthermore, purchase, storage, and maintenance of microbes are burdensome for a user. Moreover, because Korean food generally contains a lot of salt, the method using microbes is not suitable for Korean food. Therefore, the method of drying food waste has been used as the main food waste treatment method, and various developments and types of patent applications pertaining to this method have been devised.

Such food waste treatment apparatuses may be independently used, but force a user to collect food waste through a separate process and put it into a food waste treatment apparatus, thus inconveniencing the user. In an effort to overcome this problem, a food waste treatment apparatus which is directly connected to a sink such that food waste can be directly put into the apparatus from the sink has recently gained popularity.

A conventional sink bowl type food waste treatment apparatus includes a food waste inlet port through which food waste is input into the apparatus, a transfer unit which is coupled to the food waste inlet port to transfer food waste input thereinto, a drying furnace which dries the food waste, and a deodorization unit which removes offensive odors generated from the drying furnace.

The transfer unit includes a transfer blade which dehydrates and agitates food waste, a drive motor which supplies power to operate the transfer blade, and a transfer tube through which food waste transferred by the transfer blade is moved into the drying furnace.

In the conventional food waste treatment apparatus having the above-mentioned construction, a user opens the food waste inlet port and inputs food waste thereinto. Then, the drive motor is operated, so that the food waste is agitated and dehydrated by the rotation of the transfer blade.

The food waste which is treated by the transfer unit is supplied along with a small amount of sewage into the drying furnace through the transfer tube. The food waste which is drawn into the drying furnace is treated, for example, dried, in the dying furnace. Offensive odors generated in the drying furnace are treated by the deodorization unit which communicates with the drying furnace, and are then discharged through an exhaust port.

In detail, the transfer unit of the conventional food waste treatment apparatus comprises a rotating shaft which is oriented in the direction in which food waste is transferred, and a rotating screw which has a rotating blade. The rotating blade has a spiral structure and is provided on the circumferential outer surface of the rotating shaft. However, because the rotating blade has a single contiguous body, sludge which is generated around the rotating blade cannot be easily removed, thus resulting in generation of an offensive odor.

Furthermore, in the case of the conventional sink bowl type food waste treatment apparatus, food waste easily becomes adhered to the transfer unit, thus generating an odor and vermin infestations. In addition, the remnants of food waste which adhere to the transfer unit rot and generate an offensive odor. Thereby, the elements of the food waste treatment apparatus are easily corroded.

SUMMARY OF THE INVENTION

Accordingly, the present invention has been made keeping in mind the above problems occurring in the prior art, and an object of the present invention is to provide a transfer unit having a transfer rotor which is inclined at a predetermined angle so that sewage generated from food waste can be smoothly drained downwards and the dehydrated food waste is moved upwards and input into a drying furnace, thus preventing sludge from being generated in the transfer unit.

In an aspect, the present invention provides a transfer unit, including: a transfer rotor, having a rotor body, and at least one blade extending outwards from a circumferential outer surface of the rotor body; a housing having a hollow container shape and containing the transfer rotor therein such that the transfer rotor is rotatable without interference from the housing, the housing being inclined at a predetermined angle with respect to a horizontal plane; and a sieve provided in the housing to guide discharge of sewage from food waste, wherein the sieve is disposed in a lower portion of the housing to drain the sewage generated from the food waste to the outside of the housing.

The blade of the transfer rotor may be reduced in thickness from the rotor body to an outer end thereof.

The housing may have a cylindrical shape.

Furthermore, a sludge removal member may be provided on the blade such that the sludge removal member is brought into contact with an inner surface of the housing.

The sludge removal member may be made of silicone.

The housing may include: a rotor containing part containing the transfer rotor therein; and a sewage drain part provided on a portion of the rotor containing part, so that the sewage discharged from the rotor containing part is drained outside the housing through the sewage drain part.

The sieve may be provided in a bottom and a circumferential outer surface of the rotor containing part at a junction between the rotor containing part and the sewage drain part.

The transfer unit may further include a cutter provided in a top portion of the housing, the cutter having a plate shape that is open on a central portion thereof, with a cutting edge formed on an inner circumference of the cutter, so that the food waste supplied into the housing from above is cut and pulverized by sliding the blade against the cutting edge.

In another aspect, the present invention provides a food waste treatment apparatus, including a transfer unit and a drying furnace. The transfer unit includes: a transfer rotor, having a rotor body and at least one blade provided on a circumferential outer surface of the rotor body; a housing having a hollow container shape and containing the transfer rotor therein such that the transfer rotor is rotatable without interference from the housing, the housing being inclined at a predetermined angle with respect to a horizontal plane; and a sieve provided in the housing to guide discharge of sewage from food waste. The drying furnace is connected to the transfer unit to pulverize and dry the food waste introduced from an upper portion of a bottom of the housing. The sieve is disposed in a lower portion of the housing to drain the sewage generated from the food waste to the outside of the housing.

The drying furnace may include a drying container, a pulverizing screw rotating in the drying container, and a waste disposal valve provided under the drying container.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a transfer unit having a transfer rotor and a food waste treatment apparatus having the transfer unit according to a preferred embodiment of the present invention will be described in detail with reference to the attached drawings.

Figure 1:
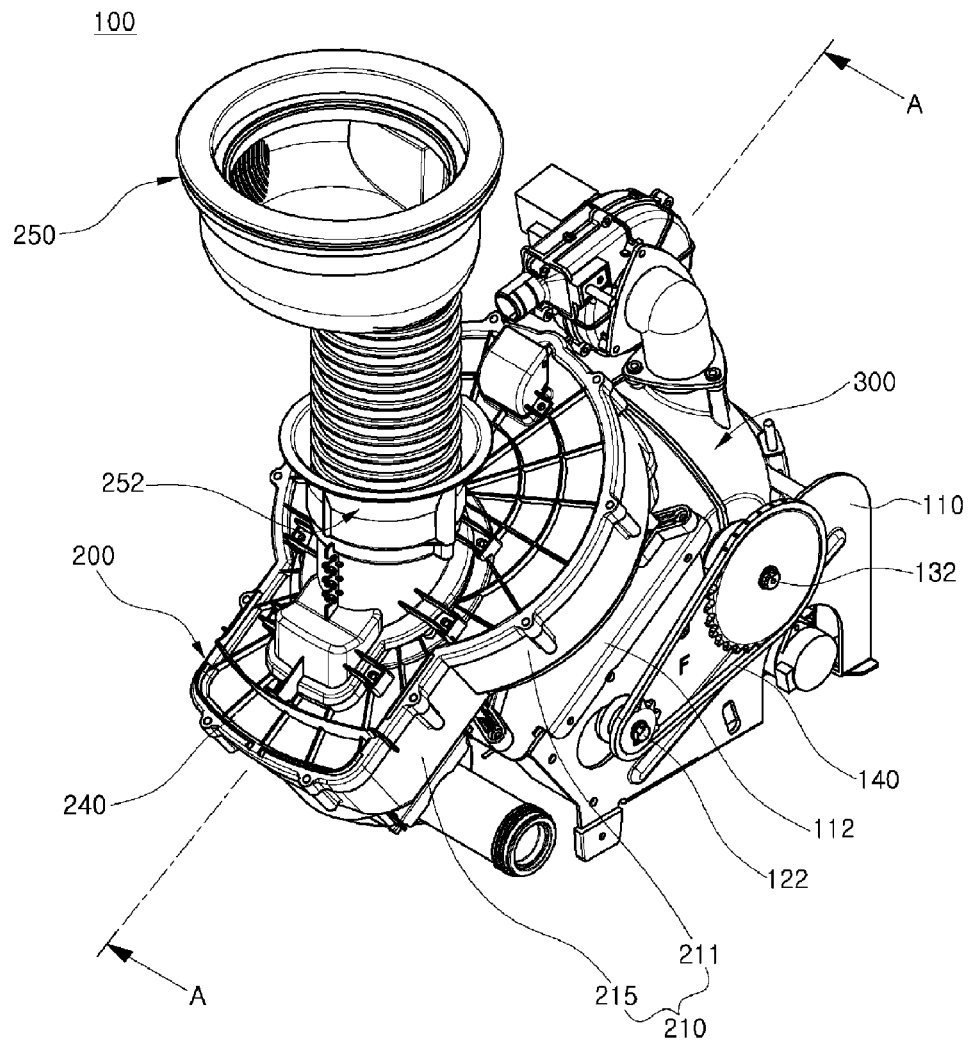
FIG. 1 is a perspective view illustrating a food waste treatment apparatus provided with a transfer unit having a transfer rotor, according to an embodiment of the present invention.
Figure 2:
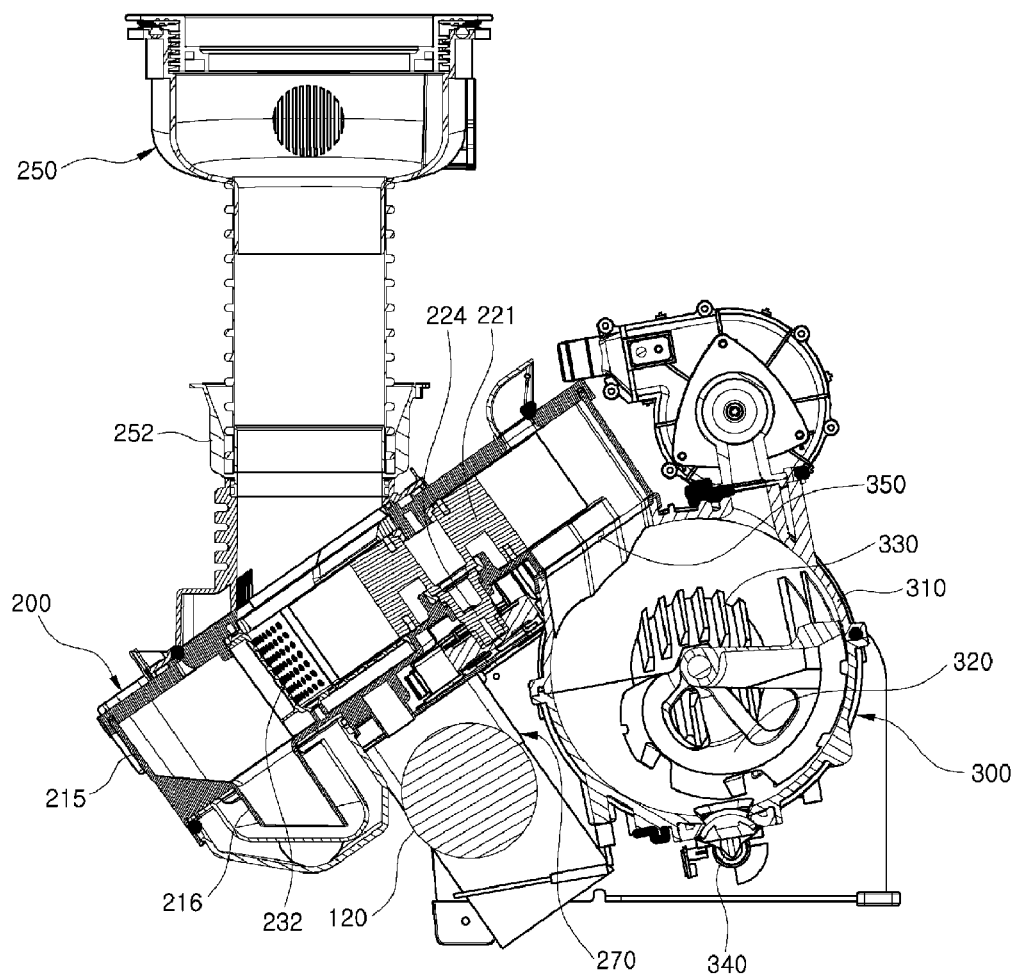
FIG. 2 is a sectional view taken along line A-A of FIG. 1.
Figure 3:
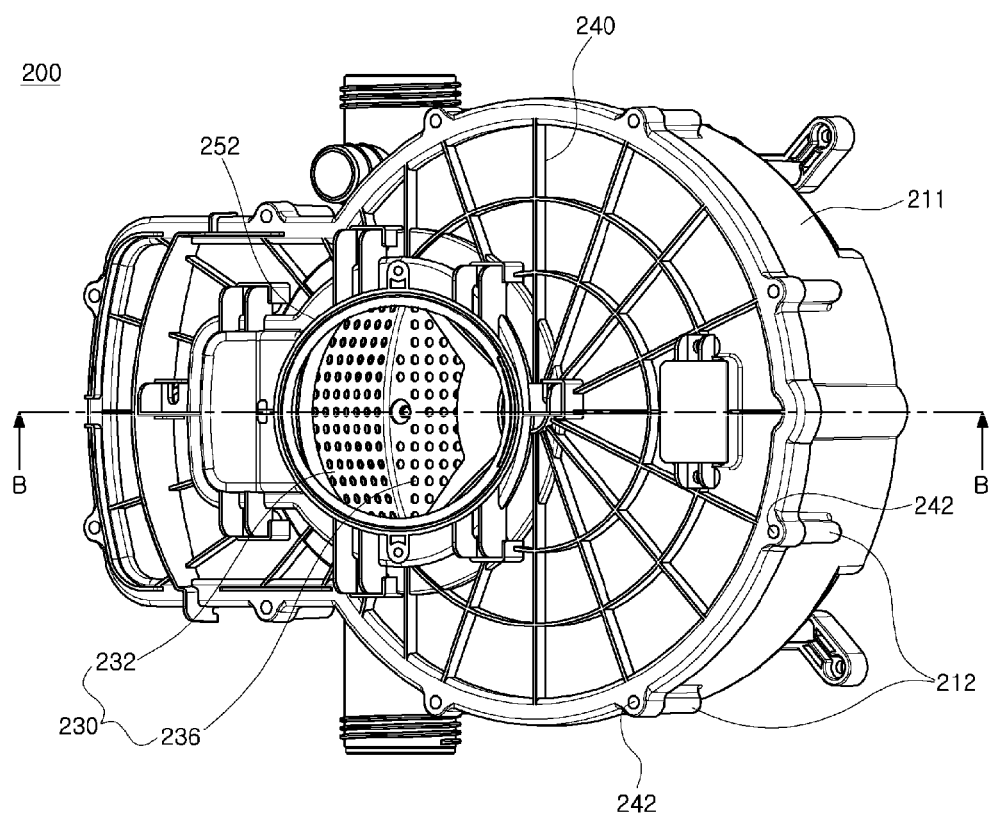
FIG. 3 is a plan view illustrating the transfer unit having the transfer rotor according to the embodiment of the present invention.
Figure 4:
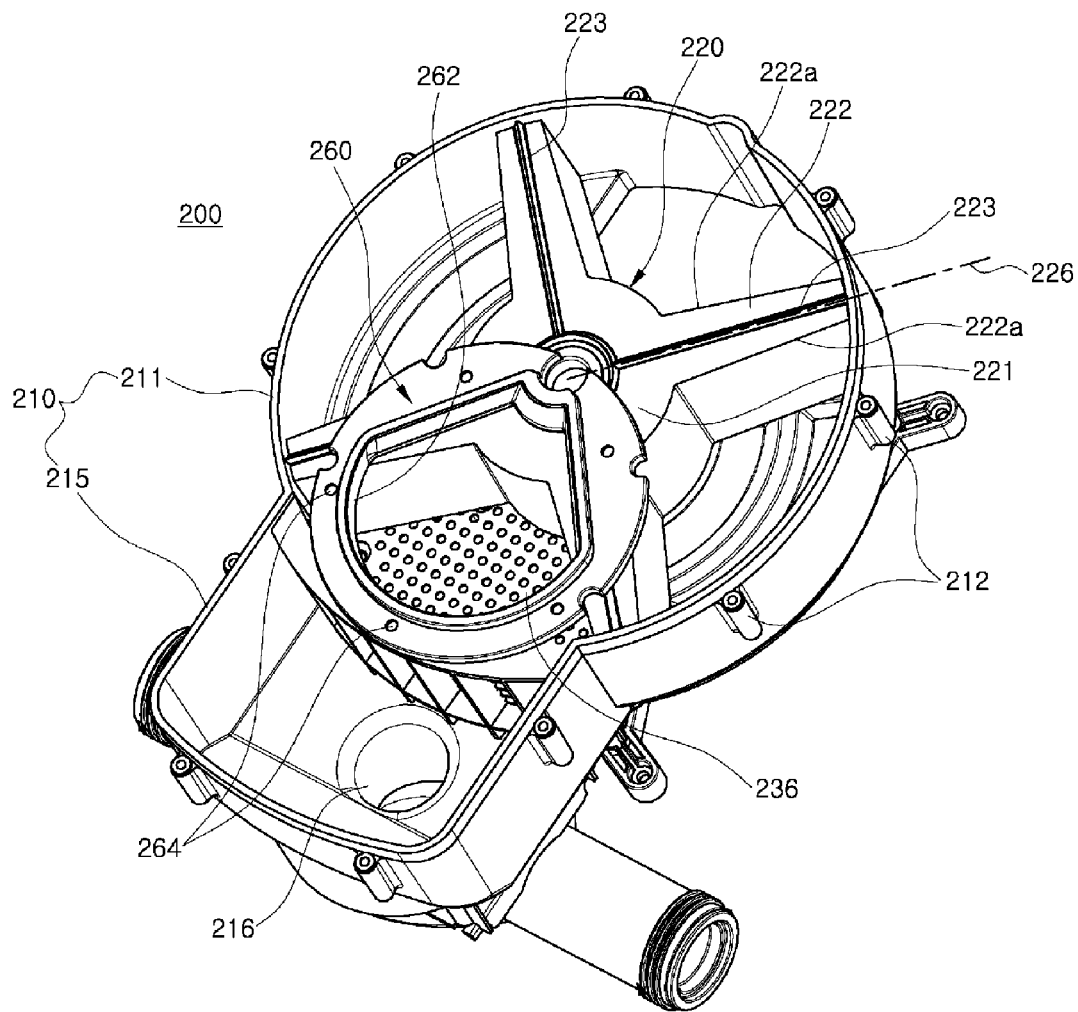
FIG. 4 is a perspective view showing the interior of a housing of the transfer unit of FIG. 3.
Figure 5:
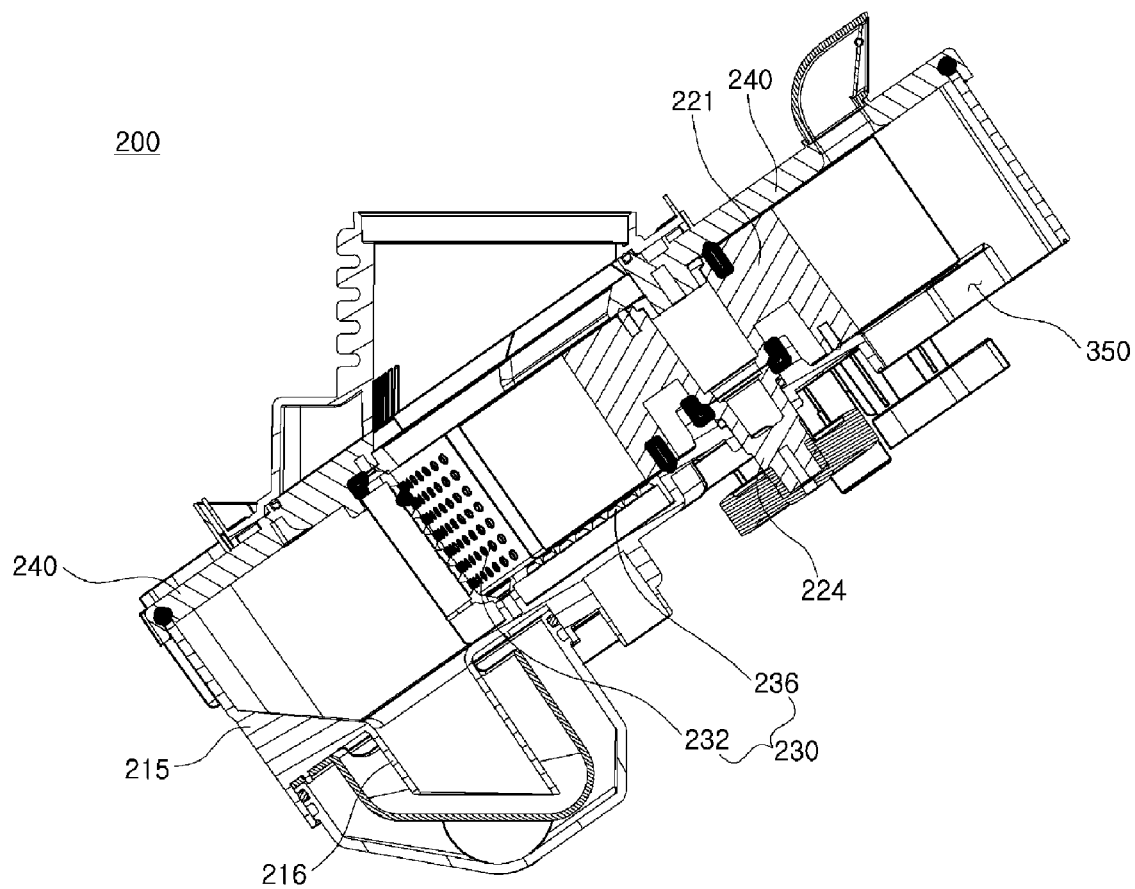
FIG. 5 is a sectional view taken along line B-B of FIG. 3.
Figure 6:
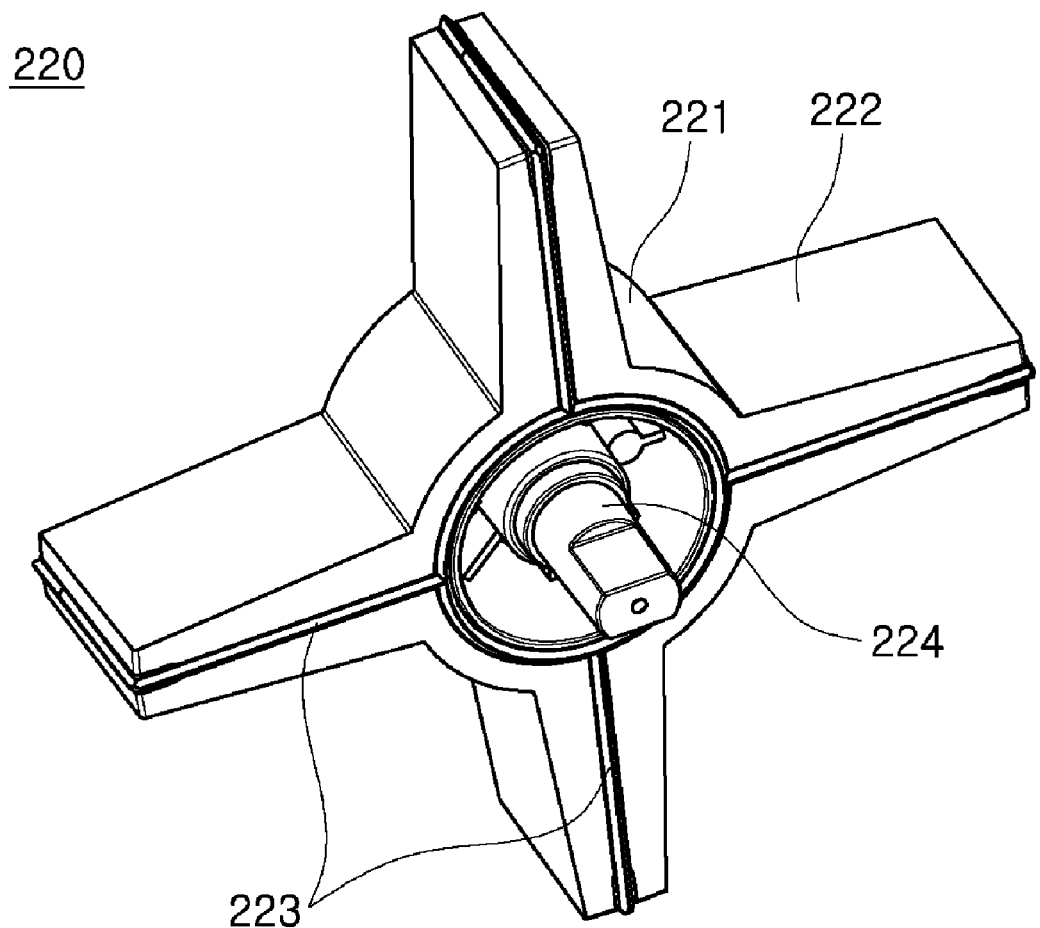
FIG. 6 is a perspective view of the transfer rotor according to the present invention.

FIG. 1 is a perspective view illustrating a food waste treatment apparatus 100 provided with a transfer unit 200 having a transfer rotor 220, according to the embodiment of the present invention. FIG. 2 is a sectional view taken along line A-A of FIG. 1. FIG. 3 is a plan view illustrating the transfer unit 200 having the transfer rotor 220. FIG. 4 is a perspective view showing the interior of a housing 210 of the transfer unit 200 of FIG. 3. FIG. 5 is a sectional view taken along line B-B of FIG. 3. FIG. 6 is a perspective view of the transfer rotor 220.

First, the general construction of the food waste treatment apparatus 100 according to the present invention will be explained with reference to FIGS. 1 and 2. Although a sink bowl type food waste treatment apparatus is illustrated in the drawings, the characteristics of the present invention are not limited to only the sink bowl type and can be applied to any type of food waste treatment apparatus for example including a free standing type, so long as it can treat food waste.

The food waste treatment apparatus 100 according to the present invention includes the transfer unit 200 which is provided on a top plate 112 of a support 110, and a drying furnace 300 which is installed in the support 110. The transfer unit 200 is provided on the top plate 112 having an inclined structure. In other words, the transfer unit 200 is oriented such that it is inclined at a predetermined angle with reference to the horizontal plane.

Furthermore, a food waste inlet port 250 is provided on the transfer unit 200 so that food waste containing water is input from a sink (not shown) into the transfer unit 200 through the food waste inlet port 250. The food waste inlet port 250 is connected to the transfer unit 200 through an inlet port connector 252. In other words, when a user inputs food waste from the sink into the food waste inlet port 250, the food waste is supplied from the food waste inlet port 250 into the transfer unit 200 through the inlet port connector 252.

Furthermore, a first rotating shaft 122 which is connected to the drive motor 120 is provided at a first position in the lower portion of the support 110. A second rotating shaft 132 which is connected to the drying furnace 300 is provided at a second position in the lower portion of the support 110. The first rotating shaft 122 is rotated by the operation of the drive motor 120 using electric power supplied through an external power line. The first rotating shaft 122 is coupled to the second rotating shaft 132 through a power transmission means 140, such as a belt or chain, to transmit power therebetween.

Hereinafter, the construction of the transfer unit 200 will be explained in detail with reference to FIGS. 3 through 6.

The transfer unit 200 includes a rotor containing part 211, a sewage drain part 215, and a housing cover 240. The rotor containing part 211 provides a space in which the transfer rotor 220 rotates. The sewage drain part 215 communicates with the rotor containing part 211, receives sewage transferred from the rotor containing part 211, and discharges the sewage to the outside. The housing cover 240 covers the top ends of the rotor containing part 211 and the sewage drain part 215. The rotor containing part 211 and the sewage drain part 215 are integrated with each other, thus forming the housing 210.

First fastening protrusions 212 are provided around the circumferential outer surface of the top end of the rotor containing part 211.

Second fastening protrusions 242 are provided around the circumferential outer surface of the housing cover 240 at positions corresponding to the first fastening protrusions 212. The first fastening protrusions 212 and the second fastening protrusions 242 are brought into close contact with and are fastened to each other by a fastening means, such as bolts. Thereby, the housing cover 240 is fastened to the housing 210.

When the transfer unit 200 is placed on the support 110, the transfer unit 200 is oriented such that the rotor containing part 211 is disposed higher than the sewage drain part 215. A food waste outlet 350 is formed through the bottom of the upper portion of the rotor containing part 211. Thus, when the transfer rotor 220 rotates, sewage flows downwards due to gravity and dehydrated food waste is moved into the food waste outlet 350 which is disposed in the upper portion of the rotor containing part 211. Thereafter, the food waste is drawn into the drying furnace 300 through the food waste outlet 350.

Preferably, the rotor containing part 211 has a cylindrical shape which has the inner surface spaced apart from the transfer rotor 220 by a predetermined distance to prevent interference between the transfer rotor 220 and the inner surface of the rotor containing part 211 when the transfer rotor 220 rotates. A sewage outlet 216 is formed through the bottom of the sewage drain part 215 so that sewage is drained to a sewage system through a separate drain pipe connected to the sewage outlet 216.

A sieve 230 is provided between the rotor containing part 211 and the sewage drain part 215. In detail, the sieve 230 is disposed in the junction between the rotor containing part 211 and the sewage drain part 215 and includes a vertical sieve part 232 which extends in the direction perpendicular to the bottom of the rotor containing part 211, and a bottom sieve part 236 which is provide in the bottom of the rotor containing part 211. The vertical sieve part 232 and the bottom sieve part 236 may be integrally formed into a single body or, alternatively, they may be separately formed and coupled to each other. The sieve 230 may be configured such that a plurality of holes is formed through a planar plate or may have a wire net structure having a mesh shape.

When the transfer rotor 220 rotates, the food waste is compressed and sewage is discharged from food waste. Sewage which passes through the vertical sieve part 232 flows into the sewage outlet 216 through the interior of the sewage drain part 215. Sewage which passes through the bottom sieve part 236 flows into the sewage outlet 216 through the bottom of the lower portion of the rotor containing part 211.

The transfer rotor 220 includes a rotor body 221 and at least one or more blades 222 which are provided around the circumferential outer surface of the rotor body 221 and extend a predetermined length in the radial direction therefrom. Each blade 222 can have any shape, so long as it can move food waste. Preferably, the blade 222 has a shape in which the thickness thereof is reduced from the circumferential outer surface of the rotor body 221 to the outer end of the blade 222. In other words, it is preferable that the blade 222 have a trapezoidal shape based on a plan view of the transfer rotor 220.

This structure of each blade 222 has an advantage in that when the transfer rotor 220 rotates food waste in a clockwise or counterclockwise direction, the food waste can be naturally moved from the vicinity of the rotor body 221 towards the outer ends of the blades 222 by the centrifugal force and the inclined surfaces of the blades 222.

In detail, referring to FIG. 4, when a straight line connecting the center of the rotor body 221 and the center of the outer end of the blade 222 is designated by a base line 226 extending from the center of the rotor body 221 in the radial direction, the blade 222 is configured such that the distance between the base line 226 and each side edge 22a of the blade 222 is reduced from the rotor body 221 to the outer end of the blade 222. Due to the above-mentioned structure, when the transfer rotor 220 is operated, the blades 222 can easily push food waste outwards with respect to the radial direction.

Meanwhile, a cutter 260 is provided on the top end of the rotor containing part 211. The cutter 260 has a plate shape which is open on the central portion thereof. Coupling holes 264 are formed through the perimeter of the cutter 260 at positions spaced apart from each other at regular intervals. The cutter 260 is disposed under the lower end of the inlet port connector 252 and fastened to the inlet port connector 252 by fastening members (not shown), such as bolts, tightened into the coupling holes 264.

Furthermore, a cutting edge 262 is formed on the inner circumference of the cutter 260 so that food waste input into the transfer unit 200 is cut or pulverized by the intersection between the cutting edge 262 and the blades 222, that is, in such a way that the rotating blades 222 slide against the cutting edge 262 of the cutter 260. Preferably, the cutting edge 262 has a circular or elliptical shape to prevent interruption of the supply of food waste into the transfer unit 200. In the case where the cutter 260 is used, a relatively large lump of food waste which is input into the food waste inlet port 250 is primarily pulverized by the intersection operation between the cutting edge 262 and the blades 222 and then moved by the blades 222 in the rotor containing part 211.

Food waste which is moved to the outer ends of the blades 222 is supplied into a drying container 310 through the food waste outlet 350. The drying container 310 is one element of the drying furnace 300. A pulverizing screw 320 and a pulverizing plate 330 are provided in the drying container 310. The pulverizing screw 320 has a spiral shape and is rotated around the second rotating shaft 132. The pulverizing plate 330 is disposed on one end of the drying container 310. A waste disposal valve 340 is provided under the drying container 310.

Food waste which is supplied into the drying furnace 300 is agitated and pulverized by the rotation of the pulverizing screw 320 and further pulverized by the pulverizing plate 330 into fine pieces. Preferably, a heater (not shown) for drying food waste is provided on the outer surface of the drying container 310. Therefore, the pulverizing process and the drying process are simultaneously conducted.

Referring to FIG. 2, a rotating shaft 224 is connected to the rotor body 221. The rotating shaft 224 receives drive force from a rotor drive unit 270 and rotates along with the rotor body 221. The rotor drive unit 270 which is provided perpendicular to the top plate 112 of the support 110 may be constructed such that it directly rotates the rotating shaft 224. Alternatively, the rotor drive unit 270 may be provided with a separate speed control unit to appropriately control the speed at which the rotating shaft 224 rotates.

Sludge removal members 223 provided on the transfer rotor 220 will be explained below with reference to FIGS. 5 and 6. The sludge removal members 223 are configured such that they are fitted into the blades 222. Each sludge removal member 223 protrudes to a predetermined distance from the outer end and the lower surface of the corresponding blade 222. The sludge removal members 223 are made of elastic and flexible material.

In detail, a groove having a predetermined width is formed in the outer end and the lower surface of each blade 222 along the central axis of the blade 222. The sludge removal member 223 is fitted into the groove of the blade 222. In addition, the sludge removal member 223 is made of material which has a low friction coefficient against the inner surface of the rotor containing part 211. Preferably, the sludge removal member 223 is made of any one selected from the group consisting of silicone, rubber and urethane or a combination of two or more selected from the group.

The sludge removal members 223 function to forcibly remove fine particles of food waste which may stick to the inner surface of the rotor containing part 211, thus preventing the fine particles of food waste from remaining in the rotor containing part 211. Furthermore, a medial connection substance (not shown) is provided between each blade 222 and the corresponding sludge removal member 223, thus maintaining a gap therebetween constant, and preventing the sludge removal member 223 from being undesirably removed from the blade 222.

Hereinafter, the operation of the food waste treatment apparatus according to the present invention will be described with reference to FIGS. 1 through 6. First, the user inputs food waste containing water into the food waste treatment apparatus through the food waste inlet port 250.

The food waste is supplied into the transfer unit 200 through the inlet port connector 252. The transfer rotor 220 is rotated in a normal or reverse direction by the operation of the rotor drive unit 260. The transfer rotor 220 rotates in the housing 210 and thus applies centrifugal force and predetermined compression force to the food waste, thus removing water from the food waste. Sewage water which is removed from the food waste during the rotation of the transfer rotor 220 is drained to the outside of the food waste treatment apparatus through the sewage drain part 215. The food waste which is partially dehydrated is moved from the central portion of the rotor containing part 211 towards the perimeter thereof along the blades 222 each of which has a shape reduced in thickness to the outer end thereof.

The food waste which is moved to the perimeter of the rotor containing part 211 is supplied into the drying furnace 300. In the drying furnace 300, the food waste is pulverized to shreds by the pulverizing screw 320 and simultaneously dried by the heater (not shown) which is provided on the outer surface of the drying furnace 300. The food waste which has been completely treated in the drying furnace 300 is stored in a separate collection box (not shown) through the waste disposal valve 340, thus enabling the user to discard the collected food waste.

As described above, in a transfer unit having a transfer rotor according to the present invention, water which is removed from food waste supplied thereinto can be naturally discharged to the outside. In addition, blades of the transfer rotor have inclined surfaces, thus effectively preventing remnants of food waste from remaining in the transfer unit during the process of transferring the food waste. Furthermore, because the food waste is effectively partially dehydrated in the transfer unit, when the food waste which is moved into a drying furnace is dried, a load applied to the pulverizing screw can be reduced and power required to dry the food waste can be reduced.

Although the preferred embodiment of the present invention has been disclosed for illustrative purposes, the present invention is not limited to the embodiment. Furthermore, those skilled in the art will appreciate that various modifications, additions and substitutions are possible, without departing from the scope and spirit of the invention as disclosed in the accompanying claims. These modifications, additions and substitutions must be regarded as falling within the bounds of the claims.

What is claimed is:

1. A transfer unit, comprising:
    a transfer rotor including a rotor body and at least one blade extending outwards from a circumferential outer surface of the rotor body;
    a housing having a hollow container shape and containing the transfer rotor therein such that the transfer rotor is rotatable without interference from the housing, the housing inclined at a predetermined angle with respect to a horizontal plane;
    a sieve provided in the housing to guide discharge of sewage from food waste; and
    a cutter provided in a top portion of the housing, the cutter having a cutting edge formed on an inner circumference of the cutter,
    wherein the sieve is disposed in a lower portion of the housing to drain the sewage generated from the food waste to the outside of the housing.

2. The transfer unit as set forth in claim 1, wherein the blade of the transfer rotor is reduced in thickness from the rotor body to an outer end thereof.

3. The transfer unit as set forth in claim 2, wherein the housing has a cylindrical shape.

4. The transfer unit as set forth in claim 2, wherein a sludge removal member is provided on the blade such that the sludge removal member is brought into contact with an inner surface of the housing.

5. The transfer unit as set forth in claim 4, wherein the sludge removal member is made of silicone.

6. The transfer unit as set forth in claim 2, wherein the housing comprises:
    a rotor containing part containing the transfer rotor therein; and
    a sewage drain part provided on a portion of the rotor containing part, so that the sewage discharged from the rotor containing part is drained outside the housing through the sewage drain part.

7. The transfer unit as set forth in claim 6, wherein the sieve is provided in a bottom and a circumferential outer surface of the rotor containing part at a junction between the rotor containing part and the sewage drain part.

8. The transfer unit as set forth in claim 1,
    wherein the cutter has a plate shape open at a central portion thereof so that the food waste supplied into the housing from above is cut and pulverized by sliding the blade against the cutting edge.

9. A food waste treatment apparatus, comprising:
    a transfer unit including a transfer rotor having a rotor body and at least one blade provided on a circumferential outer surface of the rotor body, a housing having a hollow container shape and containing the transfer rotor therein such that the transfer rotor is rotatable without interference from the housing, the housing being inclined at a predetermined angle with respect to a horizontal plane, a sieve provided in the housing to guide discharge of sewage from food waste, and a cutter provided in a top portion of the housing, the cutter having a plate shape that is open at a central portion thereof and a cutting edge formed on an inner circumference of the cutter; and
    a drying furnace connected to the transfer unit, the drying furnace pulverizing and drying the food waste introduced from an upper portion of a bottom of the housing,
    wherein the sieve is disposed in a lower portion of the housing to drain the sewage generated from the food waste to the outside of the housing.

10. The food waste treatment apparatus as set forth in claim 9, wherein the drying furnace comprises:
    a drying container;
    a pulverizing screw rotating in the drying container; and
    a waste disposal valve provided under the drying container.

* * * * *